United States Patent

Tanaka

Patent Number: 5,884,577
Date of Patent: Mar. 23, 1999

[54] DIRECTION GAUGE USING SHARED AND UNSHARED SEGMENTS

[75] Inventor: Haruto Tanaka, Saitama, Japan

[73] Assignee: Kansei Corporation, Japan

[21] Appl. No.: 926,222

[22] Filed: Sep. 9, 1997

[30] Foreign Application Priority Data

Sep. 13, 1996 [JP] Japan .................................. 8-243730

[51] Int. Cl.$^6$ .................................................... G01C 17/00
[52] U.S. Cl. .................. 116/35 R; 116/202; 116/DIG. 6; 116/DIG. 36; 116/DIG. 43
[58] Field of Search .............................. 116/202, DIG. 6, 116/DIG. 36, DIG. 35, DIG. 43, 35 R, 62.1, 62.2, 62.3, 62.4

[56] References Cited

U.S. PATENT DOCUMENTS 2,489,430  11/1949  Oliver .......................... 116/DIG. 43 X

*Primary Examiner*—Joseph L. Felber
*Attorney, Agent, or Firm*—Morrison Law Firm

[57] ABSTRACT

A direction gauge enables easy recognition of an indicated direction by constructing an arrow-shaped indication segment made up of an unshared segment and a pair of adjacent shared segments. The combination of shared and unshared segments forms an indication segment having a sharp outward-directed tip and a blunt base. The sharp outward directed tip is the outer end of the unshared segment. The blunt base is a combination of the inner end of the unshared segment together with the two adjacent shared segments. The indication segment provides a good indication of direction even if the indicia on the remainder of the display cannot be seen because of darkness.

5 Claims, 5 Drawing Sheets

DIRECTION GAUGE USING SHARED AND UNSHARED SEGMENTS

FIELD OF THE INVENTION

This invention relates to a direction gauge that is mounted, for example, on an automobile to display the direction in which the automobile is traveling.

BACKGROUND

A conventional direction gauge 1, such as shown in FIGS. 4 and 5, indicates a direction by illuminating any one or more of, for example, 16 indication segments 3 arranged in a ring on a display plate 2. The illuminated segment(s) 3 indicate the direction with respect to the automobile.

Reference markings 4, which may be created by any convenient method such as, for example, printing, indicates such things as a north-south direction line in the vertical direction and an east-west indication in the horizontal direction. Segments 3 are arranged in a ring around reference markings 4. Segments 3 may be of any convenient type such as, for example, LEDs, vacuum fluorescent displays or liquid crystal displays (LCD). Preferably, segments 3 are self-luminous so that they can be viewed in a dark environment. If a vehicle on which direction gauge 1 is mounted travels, for example, in the north-northwest direction, a magnetic sensor built into direction gauge 1 causes the segment that points to north-northwest to light up as shown in FIG. 5, thereby verifying the direction in which the vehicle is traveling.

With such a direction gauge, in a bright place, such as in daylight, the direction indication lettering and indication lines, etc. of reference markings 4 on display plate 2 are seen only in reflected light. Thus the heading direction can be seen according to the relative positions of the display position of the reference markings 4 and the display of the illuminated indication segment 3. But in the dark, such as at night, the reference markings 4 on display plate 2 cannot be seen even when an indication segment 3 is illuminated. This makes it difficult to determine which direction-pointing indication segment 3 is lit up. Consequently, a user must endure the inconvenience in the dark that it is impossible to determine the direction. This reduces or even destroys the effectiveness of direction gauge 1 as a direction gauge.

If the above indication segment 3 showing the direction is in the shape of a dot as above or in the shape of a bar as shown in FIG. 6, it is impossible to distinguish the tip end of a lit segment from its rear end, especially in the dark where the reference markings 4 on display plate 2 cannot be seen. This is inconvenient because the direction indicated by the illuminated segment 3 is ambiguous to the viewer. One way to solve this drawback is to make the indication segments 3 in the shape of an arrow as shown in FIG. 7, so that even with the lit-up display of a single arrow-shaped segment 3, one can determine the direction from the orientation between the pointed end of the arrow-shaped segment 3 and its opposite blunt end.

But the wide base of the arrow shape (triangular shape) as shown in FIG. 7, leaves room for only a small number of arrow-shaped segments 3. As shown in FIG. 7, there is room for only four, or at most eight, such arrow-shaped segments 3. This makes it difficult to indicate the precise direction.

One way to pack more said arrow-shaped segments 3 into a given area would be to give each segment 3 a roughly diamond shape as indicated by the dotted lines in FIG. 7. But then it is difficult to distinguish the sharp upper end of a segment 3 from the only slightly less sharp lower end, thus creating the inconvenience that the display definiteness.

With this invention, when it is assumed that, as in FIG. 8, the segments 3 that indicate direction are made in the form of an arrow in the shape of an isosceles triangle and a large number of these arrow-shaped segments are arranged evenly spaced in a ring with the tips of the arrow shapes pointing radially outward, then depending on the number of arrangements of arrow-shaped segments 3, there will occur, at the part near the base of the arrow-shaped segments 3, overlap parts 3A where portions of adjacent arrow-shaped segments 3 overlap each other.

OBJECTS AND SUMMARY OF THE INVENTION

It is an object of the present invention is to provide a direction gauge which overcomes the drawbacks of the prior art.

It is a further object of the invention to provide a direction gauge in which the direction-pointing indication segments are made up of a combination of shared segments of left-right pairs of the shape of the parts that correspond to the aforesaid overlap parts, along with unshared segments of the shape of the parts where overlapping does not occur. A single unshared segment together with the left-right pair of corresponding shared segments at the base of the unshared segment are lit up simultaneously to form an arrow in overall shape. This increases the number of segments 3 that may be used, and thereby increases the resolution of the direction indication.

Briefly stated, the present invention provides a direction gauge which enables easy recognition of an indicated direction by constructing an arrow-shaped indication segment made up of an unshared segment and a pair of adjacent shared segments. The combination of shared and unshared segments forms an indication segment having a sharp outward-directed tip and a blunt base. The sharp outward directed tip is the outer end of the unshared segment. The blunt base is a combination of the inner end of the unshared segment together with the two adjacent shared segments. The indication segment provides a good indication of direction even if the indicia on the remainder of the display cannot be seen because of darkness.

According to an embodiment of the invention, there is provided a direction gauge, comprising: a display plate, a plurality of identically shaped shared segments arranged equally spaced about a point on the display plate, a plurality of identically shaped unshared segments, the unshared segments having tips pointing in the outward radial direction from the point, the unshared segments being equally spaced along the circumference, each of the unshared segments, with its two immediately adjacent shared segments being combinable to form an indication segment, and the indication segment having a sharp outward-pointing tip, and a blunt base, whereby an observer is guided to discern the difference between tip and base.

According to a feature of the invention, there is provided a direction gauge comprising: a display plate, indicia on the plate indicative of a plurality of directions, a plurality of unshared segments on the display plate circumferentially equally spaced about point in the indicia, each of the unshared segments having a tip pointing radially outward, each of the unshared segments having a base closest to the point, a shared segment between each pair of adjacent bases, the shared segments being energized in conjunction with an unshared segment therebetween to form an indication segment directed to one of the plurality of directions, and shared segments adjacent each of the unshared segments forming therewith a blunt base of the indication segment.

According to a further feature of the invention, there is provided a direction gauge comprising: a plurality of unshared segments, each of the unshared segments disposed about a point, each of the unshared segments having a pointed tip pointing outward, a plurality of shared segments, each of the shared segments being disposed between bases of a pair of the unshared segments, an unshared segment and its adjacent two shared segments forming an indication segment, and the indication segment having a sharpened tip at the pointed tip and a blunt base formed by an inner portion of the unshared segment, and the adjacent two shared segments.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2(*b*) is a diagram showing a further display mode of a direction gauge according to an embodiment of the invention.

FIG. 2(*c*) is a diagram showing a further display mode of a direction gauge according to an embodiment of the invention.

FIG. 2(*d*) is a diagram showing a still further display mode of a direction gauge according to an embodiment of the invention.

DETAILED DESCRIPTION OF THE PREFERRED EMBODIMENT

Figure 1:
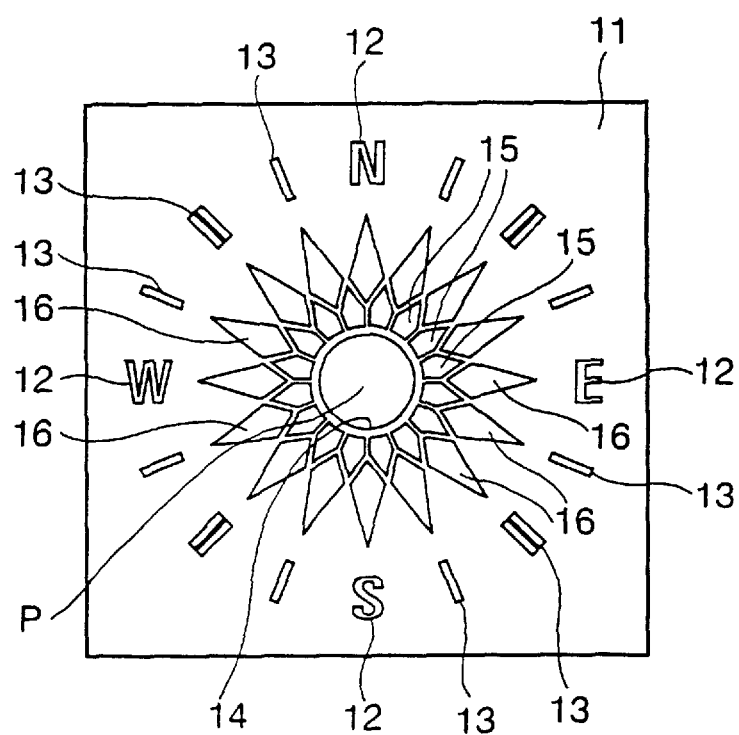
FIG. 1 is an explanatory diagram of the display surface showing an embodiment of a direction gauge according to this invention.
Figure 2A:
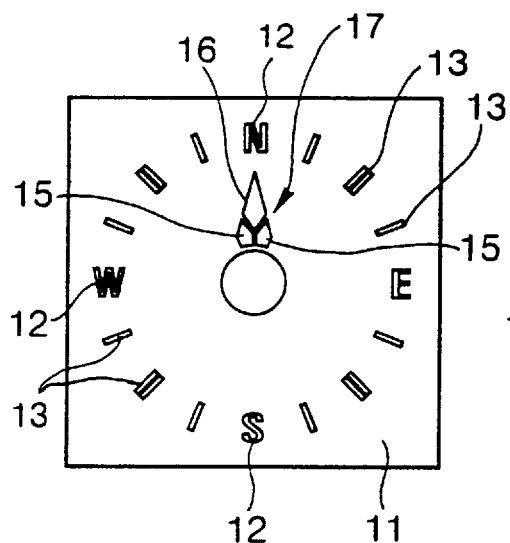
FIG. 2(*a*) is a diagram showing a display mode of a direction gauge according to an embodiment of the invention.
Figure 2B:
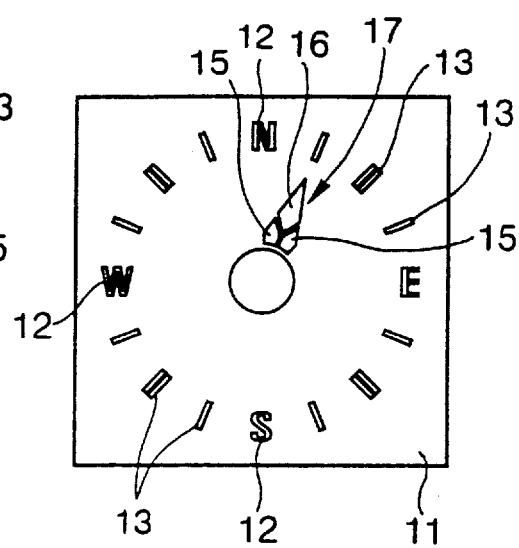
Figure 2C:
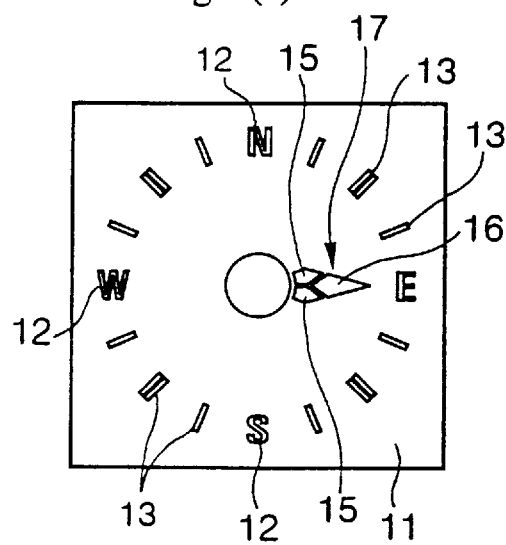
Figure 2D:
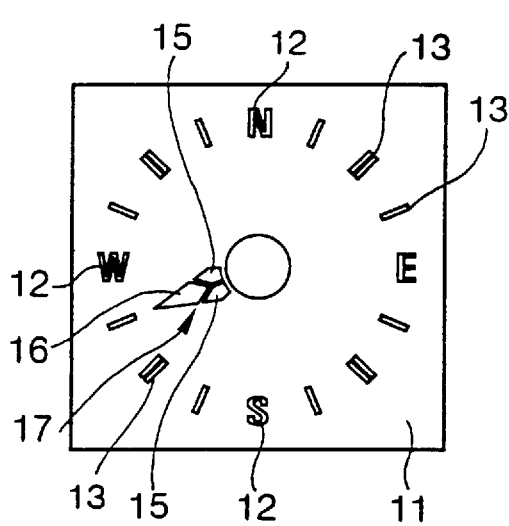

Referring now to FIG. 1, a display plate 11 of a direction gauge 1' includes thereon direction indication letters 12 equally spaced around a circumference centered on a central position (P). Direction indication letters 12 indicate the directions north, south, east, and west. Direction indication lines 13 divide the interval between adjacent direction indication letters 12 into four equal parts. This provides 16 equally spaced circumferential segments between adjacent ones of direction indication letters 12 and direction indication lines 13. Display plate 11 may be used exclusively by direction gauge 1', or it may be shared as a display plate as an integral extension of the display plates of other display devices such as speedometers or tachometers.

The markings forming direction indication letters 12 on display plate 11 may be formed by any convenient means such as, for example, by as printing.

A circular contour line 14 is positioned with central position (P) as its center. Sixteen shared segments 15 are equally circumferentially spaced around the outside of contour line 14. All shared segments 15 are of the same shape and size. In this embodiment each shared segment 15 forms a roughly pentagonal shape positioned with its tip pointing outward in the radial direction from central position (P) as the center.

Sixteen roughly diamond-shaped unshared segments are positioned adjacent to and between successive shared segments 15. The tips of unshared segments 16 each points to one of the direction indication letters 12 or direction indication lines 13. Thus the number of these unshared segments is also 16, the same as the number of the aforesaid shared segments 15.

The above shared segments 15 and unshared segments 16 consist of, for example, fluorescent display tubes, LEDs or liquid crystal displays. When power is turned off, all the segments 15 and 16 are in a non-display (extinguished) state.

When power is supplied to the direction gauge and a geomagnetic detection means detects a direction, a combination of unshared segment 16 and shared segments 15 are energized to indicate the direction. The geomagnetic detection means may be of any convenient type such as, for example, a flux gate sensor. Alternatively, a directional output of a global positioning system receiver may be used as the source of direction of motion.

Referring now to FIG. 2(*a*), for each direction, one unshared segment 16, and the two adjacent shared segments 15 are energized to form an indication segment 17 pointing in the desired direction. For the north direction detected by the direction sensor, unshared segment 16 that points to indication letter "N" and the pair of shared segments 15 located adjacent at the left and right of unshared segment 16 at the lower end of unshared segment 16 are energized simultaneously, thereby indicating the direction by an arrow-shaped indication segment 17 formed by a composite of three segments, namely, the one unshared segment 16 and the two shared segments 15.

Therefore, because the direction is indicated by an arrow-shaped indication segment 17 formed by a composite of one unshared segment 16 and two shared segments 15, the indicated direction can be seen at a glance, thereby providing a direction indication of superior directionality even if indication letters 12 and indication lines 13 on display plate 11 cannot be seen due, for example, to darkness.

Referring now to FIG. 2(*b*), when the north-northeast direction is detected by the direction sensor, then the unshared segment 16 that points north and the shared segment 15 positioned on the lower left side of this unshared segment are de-energized, the shared segment 15 previously energized on the lower right side remains energized, the unshared segment 16 that points to the north-northeast direction is energized, and the shared segment 15 positioned on the lower right side of the north-north east unshared segment 16 is energized.

Therefore, as above, the north-northeast direction is clearly indicated by an arrow-shaped indication segment 17 formed by a composite of three segments, namely, one unshared segment 16 and two shared segments 15.

The indication segments 17 shown in FIG. 2(*c*) and FIG. 2(*d*) indicate the directions east and west-southwest, respectively. Indication segments 17 for all other directions are constructed as an arrow formed by a composite of three segments, namely, one unshared segment 16 and the two adjacent shared segments 15.

Thus in this embodiment the direction-pointing indication segment 17 assumes an arrow shape in all cases, making it possible to easily and appropriately recognize the direction indicated by said segment by knowing the orientation (position) of the tip and base of an arrow-shaped pointer, even if, as when one is in the dark, and one cannot see the direction indication letters 12 and/or direction indication lines 13 on display plate 11.

Figure 3:
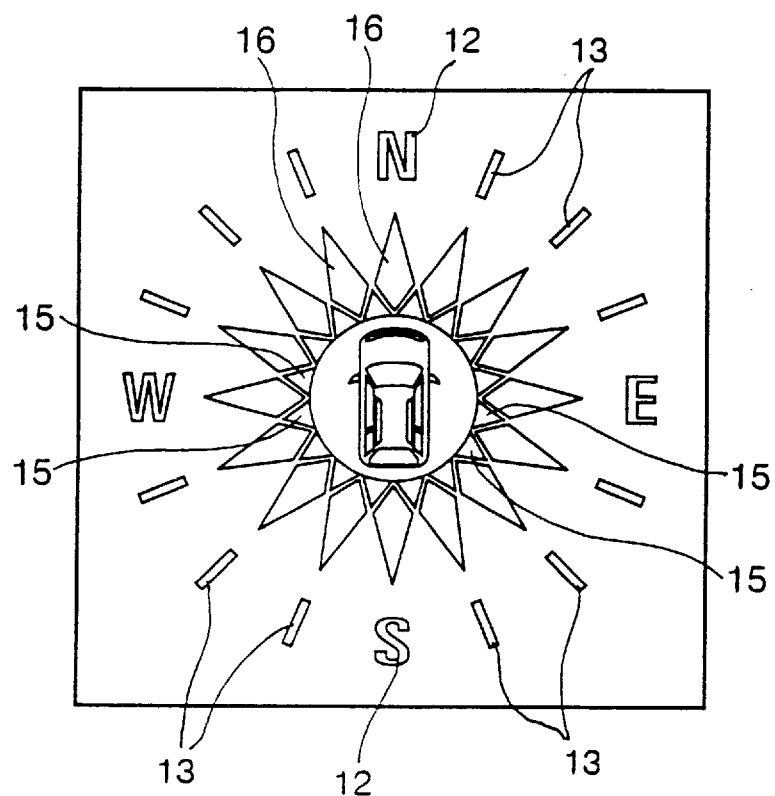
FIG. 3 is an explanatory diagram of the display surface showing another embodiment of a direction gauge according to this invention.
Figure 4:
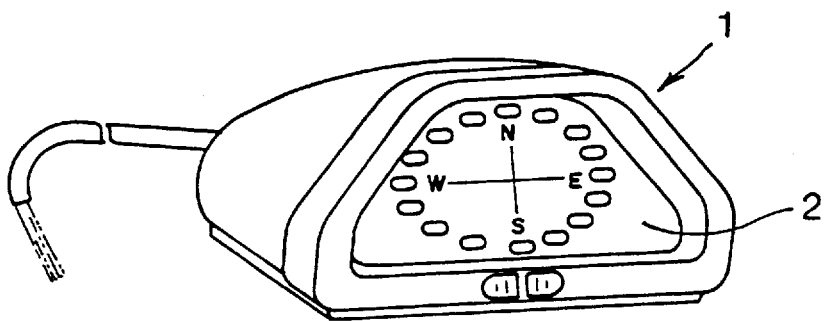
FIG. 4 is a perspective view showing a conventional direction gauge.
Figure 5:
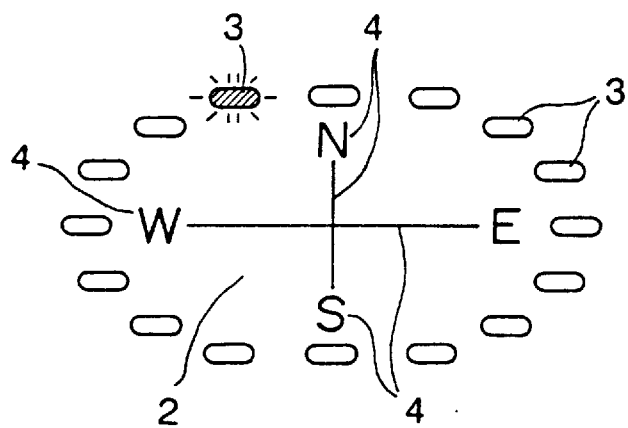
FIG. 5 is an explanatory diagram showing the display surface of a conventional direction gauge.
Figure 6:
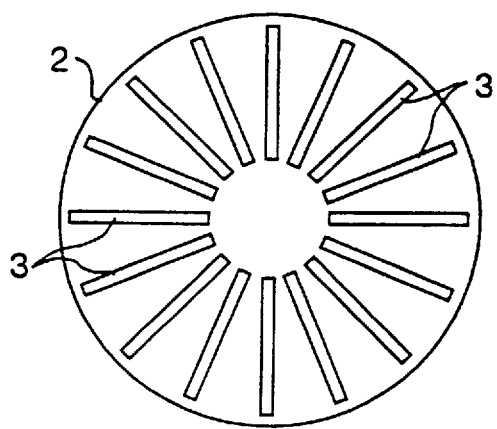
FIG. 6 is an explanatory diagram of conventional indication segments.
Figure 7:
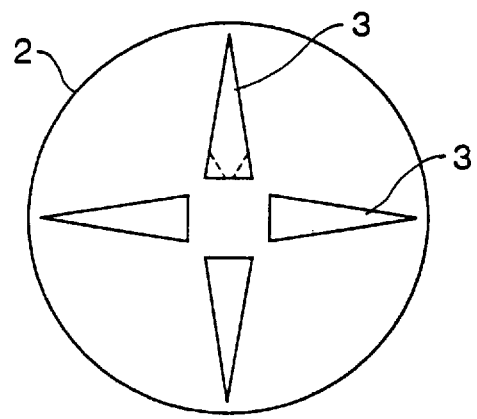
FIG. 7 is an explanatory diagram of other conventional indication segments.
Figure 8:
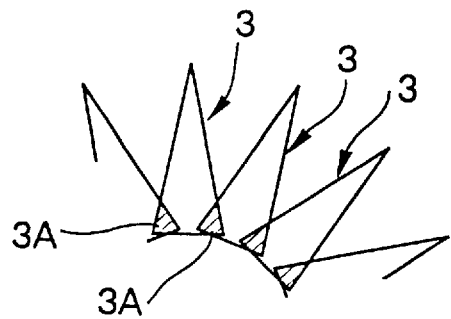
FIG. 8 is an explanatory diagram showing a drawback of conventional arrow-shaped segments.

Referring now to FIG. 3, another embodiment of this invention employs triangularly shaped shared segment 15. This forms a more readily obvious arrow-shaped (triangular) indication segment 17 by combining two shared 15 segments with one unshared segment 16. Also, in this embodiment, the artistic design effect is enhanced by an automobile logo in the central portion surrounded by the 16 shared segments 15. Alternatively, any appropriate lettering or pattern may be substituted for the automobile logo.

As described above, with this invention it is possible to form into an arrow shape any of the indication segments 17 that are displacement-displayed in each radial direction, by a composite shape of one unshared segment 16 and a pair of shared segments 15 located to the left and right at the base end of this unshared segment 16. This makes it easy to discern the direction from the orientation of the sharp tip and the blunt base of the arrow-shaped indication segment 17, even if the direction indication letters 12 and direction indication lines 13 on display plate 11 cannot be seen.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A direction gauge, comprising:

a display plate;

a plurality of identically shaped shared segments arranged equally spaced about a point on said display plate;

a plurality of identically shaped unshared segments, each of said unshared segments immediately adjacent two shared segments;

said unshared segments having tips pointing in the outward radial direction from said point;

said unshared segments being equally spaced along the circumference;

each of said unshared segments, with its two immediately adjacent shared segments being combinable to form an indication segment; and said indication segment having a sharp outward-pointing tip, and a blunt base, whereby an observer is guided to discern the difference between tip and base.

2. A direction gauge as in claim 1, wherein the number of said shared segments and unshared segments is comprises 16 of each.

3. A direction gauge comprising:

a display plate;

indicia on said plate indicative of a plurality of directions;

a plurality of unshared segments on said display plate circumferentially equally spaced about a point centered within said indicia;

each of said unshared segments having a tip pointing radially outward;

each of said unshared segments having a base closest to said point;

a plurality of shared segments, each of said shared segments located, and between a pair of adjacent bases;

said shared segments being energized in conjunction with an unshared segment therebetween to form an indication segment directed to one of said plurality of directions; and shared segments adjacent each of said unshared segments forming therewith a blunt base of said indication segment.

4. A direction gauge according to claim 3, wherein energized ones of said unshared segments and said shared segments are luminous.

5. A direction gauge comprising:

a plurality of unshared segments;

each of said unshared segments disposed about a point;

each of said unshared segments having a pointed tip pointing outward;

a plurality of shared segments;

each of said shared segments being disposed between bases of a pair of said unshared segments;

an unshared segment and its adjacent two shared segments forming an indication segment; and said indication segment having a sharpened tip at said pointed tip and a blunt base formed by an inner portion of said unshared segment, and said adjacent two shared segments.

* * * * *